(12) United States Patent
Byrne et al.

(10) Patent No.: US 6,216,970 B1
(45) Date of Patent: Apr. 17, 2001

(54) METHOD FOR REDUCING MECHANICAL DISTORTION ON MAGNETIC TAPE

(75) Inventors: Dennis H. Byrne; Alex Chliwnyj, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/386,721

(22) Filed: Aug. 31, 1999

(51) Int. Cl.[7] .................................................... G11B 15/66
(52) U.S. Cl. .......................... 242/332; 242/332.8; 360/71; 360/95
(58) Field of Search .................................. 242/332, 332.1, 242/332.7, 332.8, 532.6; 360/71, 95

(56) References Cited

U.S. PATENT DOCUMENTS

| 4,477,851 | 10/1984 | Delziel et al. | 360/95 |
| 4,519,553 | 5/1985 | Campbell et al. | |
| 5,581,419 | 12/1996 | Kobayashi | 360/71 |

*Primary Examiner*—John Q. Nguyen
(74) *Attorney, Agent, or Firm*—Robert B. Martin; Felsman, Bradley, Vaden, Gunter & Dillon, LLP

(57) ABSTRACT

A tape cartridge assembly contains a spool of magnetic tape with a leader block on one end. The leader block inserts into take-up reel and the tape is initially wound at a higher than normal tension to create a small band of tightly wound tape on the reel. The band eliminates the effect of any mechanical distortion created by the leader block. The remainder of the tape is wound on top of the tight band at normal tension to form an outer band of distortion-free magnetic tape.

19 Claims, 3 Drawing Sheets

METHOD FOR REDUCING MECHANICAL DISTORTION ON MAGNETIC TAPE

BACKGROUND OF THE INVENTION

1. Technical Field

This invention relates in general to magnetic media tape and tape drives, and in particular to reducing the mechanical distortion created in the magnetic tape at the take-up reel interface.

2. Background Art

One type of magnetic media tape on single reel tape cartridges is typically threaded into and unthreaded from a tape drive with a leading portion such as a leader block or leader tape. Occasionally, these systems experience a mechanical embossment or distortion when they are loaded into the take-up reel. This problem is more frequent with thin, high capacity magnetic tapes. The distortion typically occurs near the interface between the drive hub and the leader portion wherever there is an unsupported region or gap (see FIGS. 1–4). Ideally, the outer edge of the leader portion is substantially flush with the outer diameter of the reel hub and centered in its throat. However, in the prior art, there is a misalignment range of approximately +/–100 microns.

As shown in FIGS. 1 and 2, a small but significant embossment 11, 13, respectively (shown exaggerated for ease of understanding), is formed in subsequent layers of the thin magnetic tape 15 wrapped around the hub 17 on top of the leader block 19 at a uniform tension. Embossments 11, 13 form on top of the edges of the leader block 19, and on top of the throat edges of hub 17, respectively.

A third type of discontinuity is shown in FIG. 3. Here, a larger than normal gap 12 is formed to one side of leader block 19 when it is not centered in the throat of hub 17. Gap 12 leads to the formation of an embossment 14 in tape 15. In FIG. 4, a reel 16 has a slit 18 for receiving a piece of leader tape 20 that is spliced to the end of magnetic tape 22 with a strip of adhesive tape 24. In this configuration, two discontinuities can be formed in magnetic tape 22: an embossment 26 at the throat of slit 18, and/or an embossment 28 at or near adhesive tape 24. Each of these discontinuities can result in recording errors in the tape where data is recorded. An improved method for reducing mechanical distortion in magnetic tape is needed.

SUMMARY OF THE INVENTION

A tape cartridge assembly contains a spool of magnetic tape with a leader block on one end. The leader block inserts into take-up reel and the tape is initially wound at a higher than normal tension to create a small band of tightly wound tape on the reel. The band eliminates the effect of any mechanical distortion created by the leader block. The remainder of the tape is wound on top of the tight band at normal tension to form an outer band of distortion-free magnetic tape.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

BEST MODE FOR CARRYING OUT THE INVENTION

Figure 1:
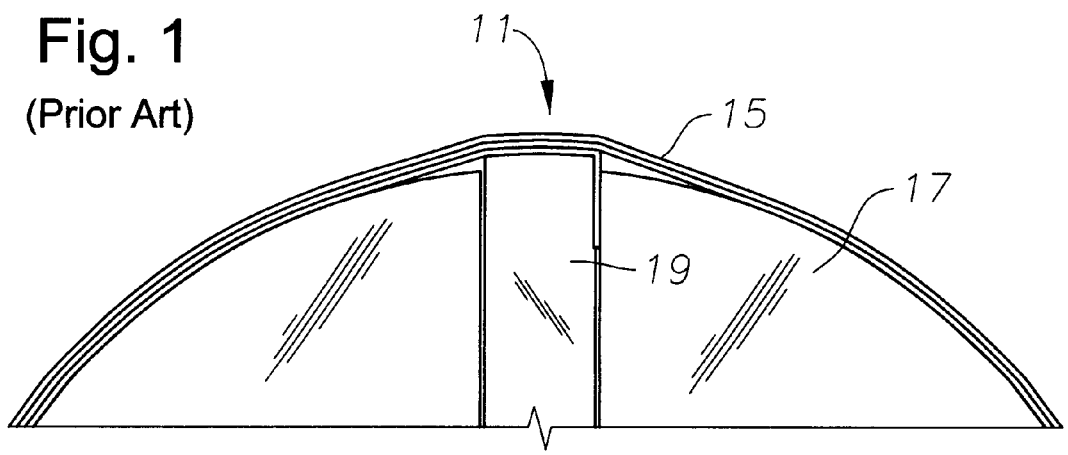
FIG. 1 is a side view of a prior art tape reel showing a protruding leader block.
Figure 2:
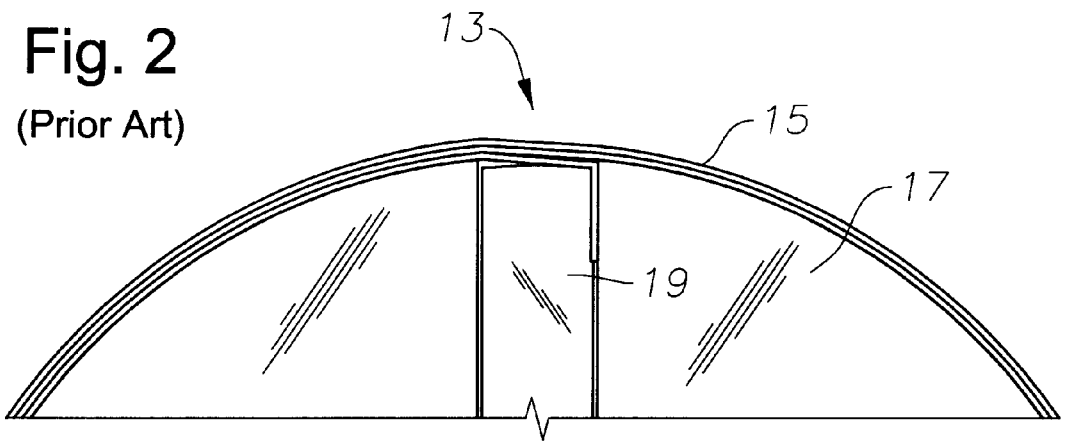
FIG. 2 is a side view of the prior art tape reel of FIG. 1 showing a recessed leader block.
Figure 3:
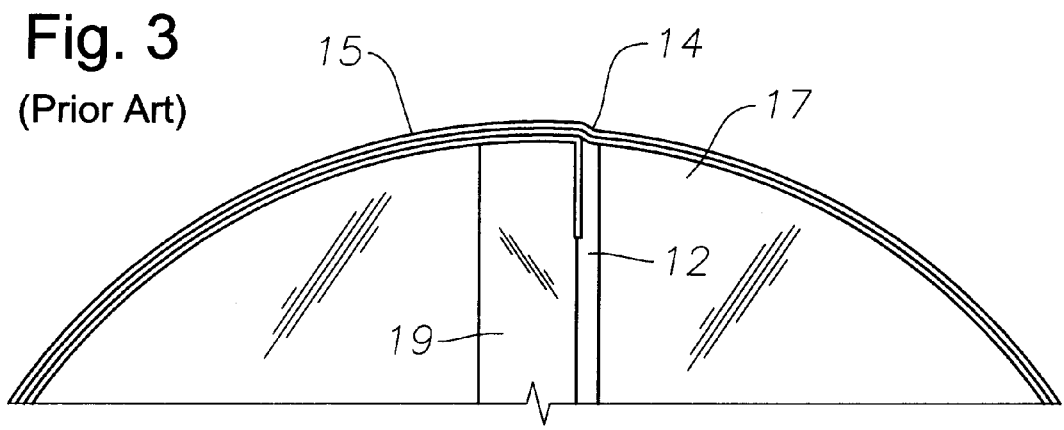
FIG. 3 is a side view of the prior art tape reel of FIG. 1 showing an off-center leader block.
Figure 4:
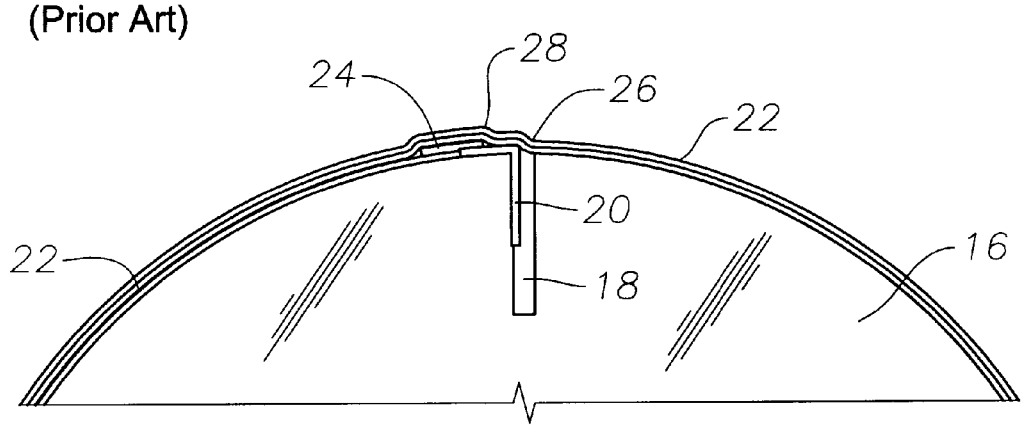
FIG. 4 is a side view of a prior art tape reel with a leader tape splice instead of the leader block of FIGS. 1–3.
Figure 5:
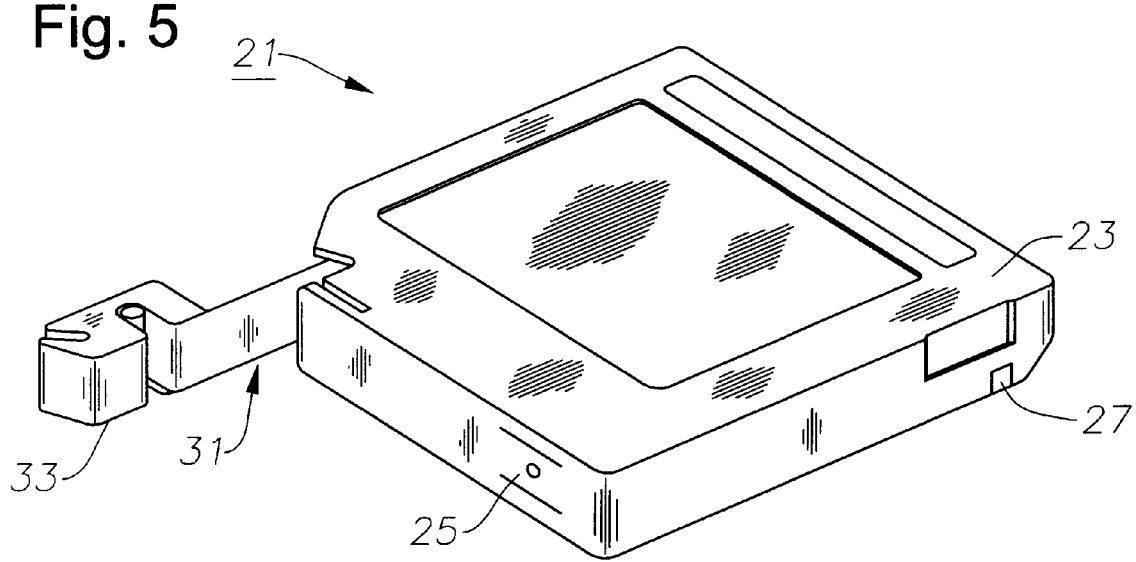
FIG. 5 is an isometric view of a tape cartridge assembly.
Figure 6:
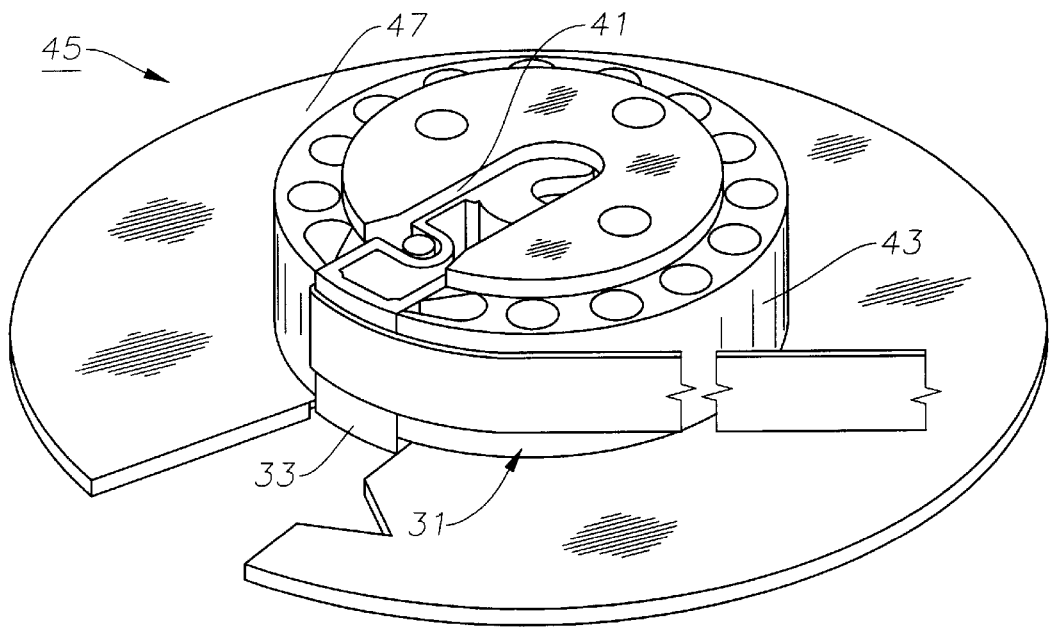
FIG. 6 is an isometric view of a portion of a tape storage reel having magnetic tape.

Referring to FIG. 5, a single reel, tape cartridge assembly 21 is shown. Assembly 21 has a cartridge case 23 with an external file-protect selector 25 and locating notch 27. Case 23 contains a spool of tape 31 that may be extracted or rewound. The free or external end of tape 31 is connected to a leader portion 33 for facilitating the loading and unloading of tape 31 onto a take-up or tape storage reel 45 (FIG. 6). In the embodiment shown, leader portion 33 is a leader block, but it should be apparent that it may also comprise leader tape and other types of leaders.

Leader block 33 inserts into a radial notch 41 in the cylindrical hub 43 of tape storage reel 45. Hub 43 is approximately 50 mm in diameter. Reel 45 has a pair of external, parallel flanges 47 (one shown) for guiding and protecting tape 31. Tape 31 comprises a thin, high capacity magnetic media tape having a thickness of approximately 11 microns and a length that substantially fills the spool in cartridge case 23.

Figure 7:
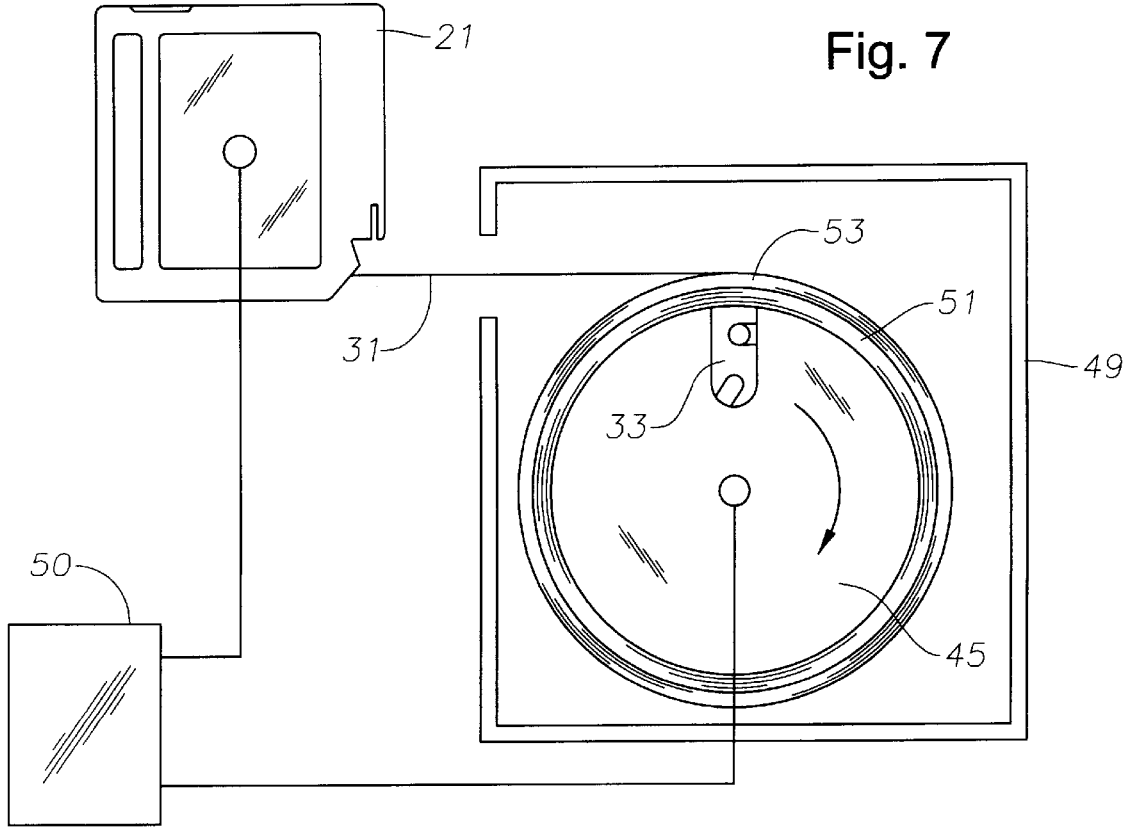
FIG. 7 is a schematic side view of the tape reel of FIG. 6 and a winding system constructed in accordance with the invention.

In operation (FIG. 7), leader block 33 is loaded into reel 45 with a drive threader 49. In the preferred embodiment, the outer edge of leader block 33 will be within 20 microns of the outer diameter of hub 43. Note that the subject of the invention is not limited to magnetic tape systems with leader blocks, but is also readily adaptable to other tape or film systems.

Tape 31 is initially wound around the hub 43 at a higher than normal operating tension by a controller 50 to create several layers or a band 51 of tightly wound tape 31 on reel 45. Band 51 may be created by using several different winding tension profiles. The tension in tape 31 can be increased by either discrete step(s), or by a continuous, ramp-like increase in tension until the desired tension level is achieved. Likewise, discrete step(s) or a continuous ramp can be used to optimize the tension profile and overcome any unsupported regions beneath tape 31.

Only a few meters of tape 31 are needed to form band 51. Band 51 reduces or eliminates the effect of any mechanical embossment or distortion that may be present due to slight variations in the depth of insertion of leader block 33 by masking its presence. The distortion is contained within band 51 and does not spread throughout the data region of tape 31. The remainder of tape 31 is wound on top of band 51 at normal operating tension to form an outer band 53 of distortion-free magnetic tape that may be read or written to.

The invention has advantages. The band of high tension tape provides a number of wraps over the discontinuity present at the take-up reel hub and tape leader block interface, thereby reducing mechanical distortion and recording errors.

While the invention has been shown or described in only some of its forms, it should be apparent to those skilled in the art that it is not so limited, but is susceptible to various changes without departing from the scope of the invention.

We claim:

1. A method for loading tape, comprising:
   (a) providing a spool of tape;
   (b) loading the tape into a tape drive having a take-up reel;
   (c) winding a first portion of the tape on the reel at a tension that is above a normal operating tension for the tape; and then
   (d) winding a second portion of the tape on top of the first portion of the tape at normal operating tension.

2. The method of claim 1 wherein step (c) comprises increasing the tension in the tape from the normal operating tension to the tension that is above the normal operating tension in a discrete step.

3. The method of claim 1 wherein step (c) comprises increasing the tension in the tape from the normal operating tension to the tension that is above the normal operating tension in a continuous, ramp-like manner.

4. The method of claim 1 wherein step (d) comprises decreasing the tension in the tape from the tension that is above the normal operating tension to the normal operating tension in a single, discrete step.

5. The method of claim 1 wherein step (d) comprises decreasing the tension in the tape from the tension that is above the normal operating tension to the normal operating tension in a continuous, ramp-like manner.

6. The method of claim 1 wherein step (d) comprises winding a remainder of the tape onto the reel.

7. A method for preventing mechanical distortion in a tape, comprising:
   (a) providing a spool of tape having a leader portion;
   (b) loading the leader portion of the tape into a tape drive having a take-up reel with a receptacle for receiving the leader portion, wherein an unsupported region forms near an interface between the leader portion and the reel;
   (c) winding a first portion of the tape following the leader portion on the reel at a tension that is above a normal operating tension for the tape to cover the unsupported region; and then
   (d) winding a second portion of the tape on top of the first portion of the tape at normal operating tension.

8. The method of claim 7 wherein step (c) comprises winding one to three meters of the tape on the reel at the tension that is above normal operating tension.

9. The method of claim 7 wherein step (c) comprises increasing the tension in the tape from the normal operating tension to the tension that is above the normal operating tension in a discrete step.

10. The method of claim 7 wherein step (c) comprises increasing the tension in the tape from the normal operating tension to the tension that is above the normal operating tension in a continuous, ramp-like manner.

11. The method of claim 7 wherein step (d) comprises decreasing the tension in the tape from the tension that is above the normal operating tension to the normal operating tension in a discrete step.

12. The method of claim 7 wherein step (d) comprises decreasing the tension in the tape from the tension that is above the normal operating tension to the normal operating tension in a continuous, ramp-like manner.

13. The method of claim 7 wherein step (d) comprises winding a remainder of the tape onto the reel.

14. A method for preventing mechanical distortion in a magnetic tape, comprising:
   (a) providing a single reel cartridge of magnetic tape having a leader portion and a normal operating tension;
   (b) loading the leader portion of the tape into a magnetic tape drive having a take-up reel with a receptacle for receiving the leader portion, wherein an unsupported region forms near an interface between the leader portion of the tape and the reel;
   (c) increasing tension in the tape to a tension that is above the normal operating tension for the tape;
   (d) winding a first portion of the tape following the leader portion on the reel at the tension that is above the normal operating tension for the tape to cover the unsupported region;
   (e) decreasing tension in the tape to normal operating tension; and then
   (f) winding a second portion of the tape on top of the first portion of the tape at the normal operating tension while reading and/or writing to the tape.

15. The method of claim 14 wherein step (d) comprises winding one to three meters of the tape on the reel at the tension that is above normal operating tension.

16. The method of claim 14 wherein step (c) comprises increasing the tension in the tape in a discrete step.

17. The method of claim 14 wherein step (c) comprises increasing the tension in the tape in a continuous, ramp-like manner.

18. The method of claim 14 wherein step (e) comprises decreasing the tension in the tape in a discrete step.

19. The method of claim 14 wherein step (e) comprises decreasing the tension in the tape in a continuous, ramp-like manner.

* * * * *